US009195953B2

(12) United States Patent
Borgerson et al.

(10) Patent No.: US 9,195,953 B2
(45) Date of Patent: Nov. 24, 2015

(54) SYSTEM AND METHOD FOR THE CALCULATION AND USE OF TRAVEL TIMES IN SEARCH AND OTHER APPLICATIONS

(75) Inventors: Bo Borgerson, Seattle, WA (US);
Kenshi Kawaguchi, Seattle, WA (US);
Matthew Lerner, Seattle, WA (US);
Josh Herst, Seattle, WA (US)

(73) Assignee: Walk Score Management LLC, Seattle, WA (US)

( * ) Notice: Subject to any disclaimer, the term of this patent is extended or adjusted under 35 U.S.C. 154(b) by 2 days.

(21) Appl. No.: 13/587,680

(22) Filed: Aug. 16, 2012

(65) Prior Publication Data

US 2013/0046795 A1  Feb. 21, 2013

Related U.S. Application Data

(60) Provisional application No. 61/524,260, filed on Aug. 16, 2011, provisional application No. 61/539,944, filed on Sep. 27, 2011.

(51) Int. Cl.
*G01C 22/00* (2006.01)
*G06Q 10/06* (2012.01)

(52) U.S. Cl.
CPC ...................... *G06Q 10/06* (2013.01)

(58) Field of Classification Search
None
See application file for complete search history.

(56) References Cited

U.S. PATENT DOCUMENTS

| | | | |
|---|---|---|---|
| 6,542,748 B2 | 4/2003 | Hendrey et al. | |
| 6,591,263 B1 * | 7/2003 | Becker et al. | ......................... 1/1 |
| 8,699,991 B2 * | 4/2014 | Fasold | ..................... 455/404.2 |
| 2002/0035535 A1 | 3/2002 | Brock | |
| 2006/0184314 A1 * | 8/2006 | Couckuyt et al. | ............. 701/202 |
| 2006/0227047 A1 * | 10/2006 | Rosenberg | ............... 342/357.13 |
| 2006/0247956 A1 | 11/2006 | Rosen et al. | |
| 2006/0287810 A1 | 12/2006 | Sadri et al. | |
| 2008/0208443 A1 * | 8/2008 | Massie et al. | ................. 701/200 |
| 2009/0005968 A1 * | 1/2009 | Vengroff et al. | ............. 701/202 |
| 2009/0088967 A1 | 4/2009 | Lerner et al. | |
| 2009/0089149 A1 | 4/2009 | Lerner et al. | |
| 2011/0177845 A1 * | 7/2011 | Fasold | .......................... 455/566 |
| 2012/0136572 A1 * | 5/2012 | Norton | .......................... 701/465 |

(Continued)

OTHER PUBLICATIONS

Non-Final Office Action, U.S. Appl. No. 13/587,849, Mail Date Nov. 7, 2013, 7 pages.

(Continued)

*Primary Examiner* — Hung Le
(74) *Attorney, Agent, or Firm* — Perkins Coie LLP

(57) ABSTRACT

A system and method are provided for generating travel sheds which show the area reachable in a given amount of time by different modes of transport. A travel shed may consist of a series of polygons or other geometric shapes showing areas reachable from a given address or location within a specified travel time utilizing a specified mode of transport (e.g. driving, biking, walking, public transportation, etc.). Techniques are disclosed for enabling rapid calculations of travel times. In one embodiment, rapid generation of travel times and associated travel sheds may be enabled by performing pre-processing steps (e.g. downsampling, progressive road type removal, etc.) on road graph data. The pre-processing steps reduce the road graph while still preserving enough to generate accurate travel sheds. One example use of travel sheds is to enable searching for points of interest (e.g. homes, apartments, hotels, restaurants, schools, parks, etc.) according to specified travel times.

25 Claims, 14 Drawing Sheets

(56) References Cited

U.S. PATENT DOCUMENTS

| | | |
|---|---|---|
| 2013/0046586 A1 | 2/2013 | Lerner et al. |
| 2013/0204527 A1* | 8/2013 | Schilling et al. ............. 701/533 |
| 2014/0012772 A1* | 1/2014 | Pretorius ....................... 705/330 |

OTHER PUBLICATIONS

Zheng et al., "Understanding Transportation Modes Based in GPS Data for Web Applications," ACM Transactions on the Web, vol. 4, No. 1, Jan. 2010, 36 pages.

* cited by examiner

SYSTEM AND METHOD FOR THE CALCULATION AND USE OF TRAVEL TIMES IN SEARCH AND OTHER APPLICATIONS

CROSS-REFERENCE TO RELATED APPLICATION(S)

This application claims the benefit of U.S. Provisional Patent Application No. 61/539,944, entitled "System and Method for the Calculation and Use of Commute Times in Search and Other Applications" and filed Sep. 27, 2011, and U.S. Provisional Patent Application No. 61/524,260, entitled "System and Method for Assessing Quality of Public Transit" and filed Aug. 16, 2011, each of which is incorporated herein by reference in its entirety.

BACKGROUND

One factor that people often consider to be important when searching for apartments or homes is the amount of time it takes to travel to work. For people with children, travel time to a school may also be an important factor. For a person choosing a location for a business, it may be desirable to know how many homes can reach the business within a reasonable travel time (e.g. for determining numbers of potential customers, making commutes shorter for employees, etc.). While there are many applications available that will provide a driving time calculation from one individual location to another, a need exists for more comprehensive systems that can evaluate and present commuting information for multiple options in an expedient manner.

DETAILED DESCRIPTION

Figure 1:
FIG. 1 is a diagram of a screen display illustrating an example visual representation of map data and a corresponding travel shed.

A system and method are provided for generating travel sheds which show the area reachable in a given amount of time by different modes of transport. A travel shed may consist of a series of polygons or other geometric shapes showing areas which are reachable from a given address or location within a specified travel time by utilizing a specified mode of transport (e.g. driving, biking, walking, public transportation, etc.). In particular, the disclosed system and method allows for the rapid calculation of travel times and the rapid generation of associated travel sheds for each mode of transport. Users of the system are thereby able to quickly and easily assess multiple travel options in a particular geographic region. Travel sheds may also be multi-modal (e.g. a person may walk or bike to a bus stop and then take the public transit, etc.) Multi-modal travel sheds may in some instances be based in part on known points of switching from one mode of transport to another (e.g. train or subway stations, bus stops, ferry terminals, user defined switching points, etc.)

As mentioned, a travel shed is generated relative to a specified location. A location used to serve as a basis for generating a travel shed may be specified by any suitable means, including explicitly specified, for example, using identifying information such as a physical address, a latitude/longitude specification, or an indication on a map. A location may also be implicitly specified, for example, by deducing a nearest building to a stop on a transit route (e.g., clicking on, selecting, and/or hovering over, a point) using an interacting mapping application. A location may also be specified via Location Based Service ("LBS") features of an interactive mapping application or mobile device. For example, LBS functionality installed on a mobile phone may sense the physical location of the mobile phone and provide the sensed location to the travel shed provider service as the specified location. Other means of specifying locations relative to some other point or area may also be incorporated into a travel shed provider service, such as by allowing users to drag icons, draw areas, specify cities or particular neighborhoods, or perform other operations within an interactive mapping application.

To allow the rapid generation of travel sheds, the system begins with a graph of all of the road data in a particular geographic area being analyzed (e.g., an area representing the average travel time from a location, a city, a state, a country, the world, etc.). The system then implements a number of pre-processing steps (e.g. downsampling, progressive road type removal, etc.) on the road graph data. The pre-processing steps are intended to reduce the size of the road graph data while still preserving enough of the road graph to generate accurate travel sheds. It will be appreciated that the term "road graph" as used herein is intended to encompass all possible pathways of travel, and includes all types of networks (e.g. transit networks, bike networks, etc.)

One pre-processing step that may be applied by the system is downsampling of the road graph data to eliminate certain lower priority nodes. The road graph is composed of nodes (e.g., places where roads intersect), and edges (e.g., which contain information about the roads, such as distance or travel time with traffic). Downsampling eliminates nodes that are within a certain threshold distance or travel time of each other. For example, the system may remove non-branching nodes (e.g., nodes with only 2 neighbors, which may not be intersections) that are within a specified threshold travel time of other nodes (e.g., within 2 minutes of other nodes).

Another pre-processing step that may be applied by the system is the progressive removal of certain types of roads depending on a selected mode of transport (e.g., walk, bike, drive, public transportation, etc.). The removal of certain types of roads is done in such a way so as to reduce the size of the road graph data while maintaining the ability to generate accurate travel sheds. The system progressively removes road types until the road graph has a density of nodes that allows the system to quickly calculate travel times and generate a travel shed. The density of nodes may be calculated per unit area (e.g., 20,000 nodes per square mile). The unit area is determined based on the mode of transport, where the total unit area is designed to encompass the largest reasonable travel shed for that mode of transportation. In addition, each mode of transport is designated as having a different set of road priorities.

When the mode of transportation is driving, the set of road priorities for driving may assume long travel distances in the progressive removal of roads. It will be appreciated that long drives may cover very large distances and the full road graph may be too large to allow the system to rapidly generate a corresponding travel shed for driving. In one implementation, in order to reduce the size of the road graph, the system progressively eliminates the smallest roads first until the graph reaches the desired density. By preserving large roads and highways, a resulting travel shed will contain the most important roads for driving. In one example implementation, the road type priority for driving in progressive order consists of: motorway; motorway link; trunk; primary; primary link; secondary and tertiary.

When the mode of transportion is walking, in the progressive removal of roads the system may eliminate the largest roads first since the largest roads might not accept pedestrians or might be less desirable for walking. By preserving the smallest roads first, the system can quickly generate travel sheds that are accurate for walking. In one example implementation, the road type priority for walking in progressive order consists of: path; footway; pedestrian; living street; footpath; trail; primary; primary link; secondary; tertiary and residential.

When the mode of transportation is biking, in the progressive removal of roads it is assumed that long rides can also cover large distances and have large road graph sizes. For biking, the system removes the largest and smallest roads to keep mid-sized arterial streets. Focusing on the moderately-sized roads allows the system to generate accurate bike sheds without having too large of a road graph. In one example implementation, the road type priority for biking in progressive order consists of: cycleway; path; trail; living street; primary; primary link; secondary and tertiary.

Various other techniques may be utilized by the system to further reduce the size of the stored road graph. For example, after reducing the road graph size by making the road graph progressively more sparse, the system further simplifies the road graph by storing the road graph as an array of nodes and an array of edges that index into the nodes, where the edges contain travel time between nodes. Moreover, the system may store optimized graphs for each mode of transport (e.g., drive, walk, bike, public transportation, etc.) utilizing a geohashing technique. The file system contains a directory structure for each mode of transport, a directory name that is based on latitude, and a file name that is based on longitude. Storing using a geohashing technique allows the system to quickly query exactly the graph data it needs for each mode of transport to optimize the process of generating a travel shed.

The optimized road graphs are used by the system to generate travel sheds. In one embodiment, the system transmits the optimized road graphs to a web browser or application for generating the travel sheds. Alternatively, the system may calculate the travel shed on a server and transmit the generated travel shed to a client.

In order to generate a travel shed, the system builds two data structures from the optimized road graph data. First, the arrays of nodes and edges are reconstituted into a directed graph. The system may use a breadth first traversal to generate travel times to each node in the graph. In certain implementations, breath first traversal may be relatively efficient in that the system is more likely to see the fastest travel times earlier in the traversal. It will be appreciated that other traversal techniques, however, may also be utilized by the system.

Once the system has built the directed graph, a point cost matrix is created from the directed road network graph. The point cost matrix is an array of tuples that contain the time it takes to reach a given node on the graph, which may be represented as a latitude and longitude. To generate a travel shed for a given time (e.g. 20 minutes), the system uses the point cost matrix to quickly look up which points should be included in the travel shed and discards any tuples that have a travel time greater than the specified time.

The travel sheds generated by the system may be used in various applications, such as applications that allow for searching for rentals or housing for sale, hotels, or finding other points of interest such as restaurants within a given travel time. In order to facilitate such use, the system utilizes a method to rapidly test for inclusion in the travel shed.

In one embodiment, a geohash table is constructed that allows the system to rapidly find the nearest nodes and associated travel times for any location. To optimize the performance of these lookups, the system eliminates nodes that are close together to reduce the number of required lookups. Once the geohash table is built by the system, the system can quickly look up the travel time to any point. The use of a geohash table allows the system to quickly determine whether a point of interest is within a travel shed. In one example implementation, the system can rapidly show the travel time to any nearby point of interest (e.g. showing the commute time to an apartment when the user hovers their mouse over the map) or allow users to sort points of interest by travel time.

The system may utilize any of a number of different methods to depict or draw a travel shed. One method is to use bubbles that expand around each reachable node at a speed that is consistent with the travel mode. For example, at each reachable node an expanding bubble is drawn with a radius that is a constant speed for a given mode of transport (e.g. driving, biking, walking, public transportation, etc.). Another method for drawing a travel shed is to calculate the union of all of the bubbles and draw polygons or other geometric shapes representing the reachable areas. Another method is to utilize a travel time contour map where polygons or other geometric shapes are drawn connecting nodes in the graph that are reachable at specific time intervals. A travel shed may be generated dynamically in a web browser, mobile application, or other application. As the user adjusts a time slider or other user interface, the travel shed may be animated by the system to show the area that corresponds to the new travel time.

In some embodiments, the travel sheds may be enhanced with other data that affects travel times. In other words, a number of factors may affect travel times that are not related to the underlying road network. For example, weather, heavy traffic, priority lanes (e.g. carpool), toll roads, hills, etc, may affect drive times and/or the speed at which people can bike or walk. In addition, feedback may be provided (e.g. directly from users or users' devices) regarding the accuracy of the system's travel time information, or to personalize the estimated travel times for individual users (e.g. some users travel faster than others), or to account for variable travel times. Travel sheds can therefore be made more accurate by incorporating data regarding these types of factors into the graph.

To enhance travel sheds with traffic data, the system uses the traffic data to adjust the road speed from the posted speed limit to the actual speed of travel during different times of the day. When the system converts a graph edge from distance into travel time, the system does so using the posted speed limit of the road or alternately using the actual travel speed based on traffic data. Thus, travel sheds for driving can be generated that cover different distances at different times of the day. For example, a rush hour travel shed may be smaller than a travel shed calculated when there is less traffic.

To enhance travel sheds with elevation data, they system uses the elevation to determine the impact of hills and adjust travel sheds for walking and biking. When the distance of a graph edge is converted into a travel time, hills can be used to apply a penalty to the travel speed. For example, the average biker may typically ride at a specified speed (e.g., 12 mph) and elevation gain can be used by the system to penalize the speed for each percent of grade increase. With regard to going down hills, each percentage of elevation grade decrease can be used to increase the biking speed up to some maximum speed. Similar techniques can be applied for walking.

In some embodiments, the system may also generate multiple travel sheds on the same display and show the intersecting area(s). For example, a family may have multiple commutes to multiple schools, jobs, where friends live, etc. A travel shed can be generated by the system for each commute and transport mode and the intersection of the travel sheds can be calculated and/or displayed by the system. The intersection of the travel sheds can yield the locations for points of interest (e.g. apartments, houses, etc.) that satisfy all of the commuting preferences. Also, one person might be interested in having multiple travel options to work or other locations. For example, one person might want to have a 20 minute bike option to work as well as a 30 minute public transit option. Travel sheds meeting these requirements could be constructed and their intersection determined in order to identify locations that allow both desired commutes to the same office location.

In order to search for desired points of interest (e.g. homes, apartments, hotels, restaurants, schools, parks, etc.) the polygons or other geometric shapes representing a travel shed can be used as a search criteria with a geospatial database to return the desired points of interest that match the travel shed. Points of interest can be further sorted by other factors (e.g. travel time to work, travel time from the airport, etc.). Other criteria such as whether a point of interest is near a public transit stop could also be used for sorting. For example, travel sheds could be used to find a meeting place for two people in different locations who want to meet at a highly rated coffee shop that is an easy commute for both people.

In some embodiments, the area within a travel shed can be utilized for a variety of types of analysis. For example, a business may want to know how many people are within a given commuting distance from a location where they are considering moving. To calculate this, a geospatial database containing population data could be queried by the system using the travel shed as input to calculate the number of people living in a travel shed. As a more specific analysis for a given set of employees, a travel shed for every employee could be calculated for different transport modes and the areas of greatest intersection could be calculated to determine an ideal office placement. A public transit analyst might be interested in the percentage of people in a city that can travel to a specific location in a given amount of time. For example, it may be desired to know how many citizens of a city are able to reach downtown in a 20 minute travel. A city planner might want to know how many jobs are reachable from downtown in a 10 minute transit ride. A geospatial database containing job data could be queried with the travel shed as input to calculate the number of people living in a travel shed. A real estate consumer or professional might want to know the average price of real estate within a certain travel of a location, or other statistics about homes or apartments that exist within a travel shed of a given location. A consumer might want to have a mobile application or website that allows them to find a point of interest within a certain commuting time. For example, a consumer may wish to find the best restaurant that can be traveled to within a specified period of time. In general, the travel shed service may be offered as an API. Also, a system may be provided for rating/scoring/sorting points of interest based on how well they meet the specified travel times and mode of transport preferences (e.g. a consumer wishing to find a top rated seafood restaurant within a 10 minute bike ride.)

Various embodiments of the invention are described below. The following description provides specific details for a thorough understanding and an enabling description of these embodiments. One skilled in the art will understand, however, that the invention may be practiced without many of these details. In addition, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a diagram of a screen display 100 illustrating an example visual representation of map data and a travel shed that is generated by the system. As shown in FIG. 1, a selection area 105 is provided with a series of tabs that a user may select (e.g. "apartments and rentals", etc.). A point of origin field 110 is provided for a user to specify a point of origin for a travel shed (e.g., Seattle, Wash.). A slider bar 112 is provided for a user to specify a travel time (e.g. 31 minutes). A mode of transport bar 114 is provided for a user to select from different modes of transport using buttons A, B, C and D, which, in the depicted example, correspond to public transportation, driving, biking or walking, respectively. A "go" button 116 is provided for a user to initiate a process for generating a travel shed.

As shown in FIG. 1, after the user has defined the travel parameters and a travel shed has been generated by the system, the apartments or rentals located within the travel shed are listed to the right in a results area 130. A first example result 132 shows a one bedroom apartment in Capitol Hill with a 21 minute travel time using public transportation, and a second example result 134 shows an apartment building in Westlake with a 17 minute travel time using public transportation.

A map area 150 generated by the system includes a visualization of the travel shed 165. A point of origin 160 (i.e. corresponding to the entry "Seattle" in the point of origin field 110) is indicated on the map. The travel shed 165 is shown to include a number of travel shed areas 165A, 165B and 165C, which indicate the areas that can be reached within the travel time indicated by the slider bar 112 (31 minutes in the depicted example) utilizing the mode of transport selected in the bar 114 (public transit in the depicted example). Within the travel shed areas 165A, 165B and 165C, visual indications are provided of the available apartments and rentals, which are also displayed in the results area 130.

Figure 2:
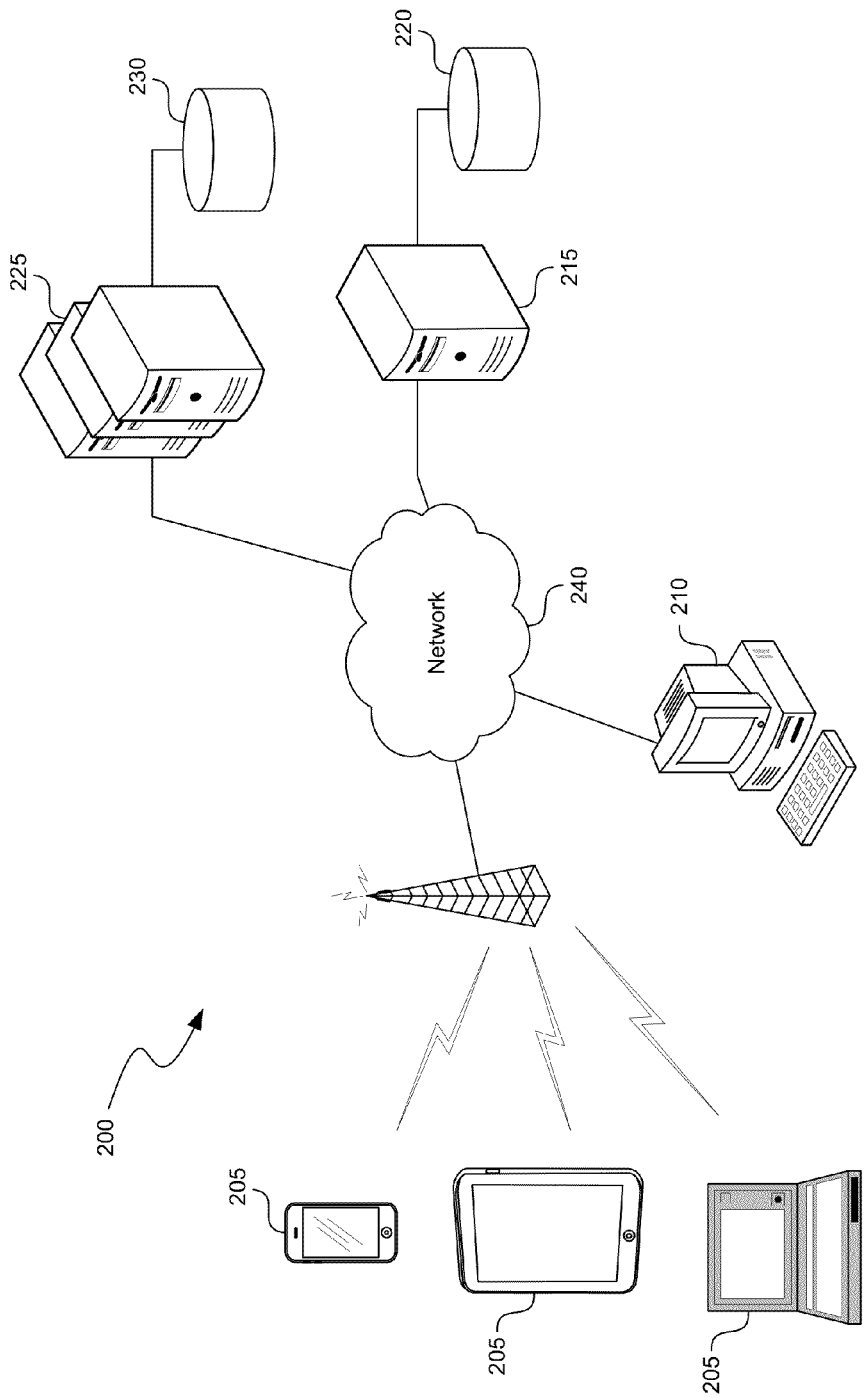
FIG. 2 is a diagram of a suitable environment in which a travel shed system may operate.

FIG. 2 and the following discussion provide a brief, general description of a suitable computing environment 200 in which a travel shed system can be implemented. Although not required, aspects and implementations of the invention will be described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The system and method can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to the example of FIG. 2, a travel shed system 200 operates in or among mobile devices 205, personal computers 210, and one or more server computers 215. The mobile devices 205 and personal computers 210 communicate through one or more public or private, wired or wireless networks 240 with the server 215. A data storage area 220 contains data utilized by the travel shed system, and, in some implementations, software necessary to perform functions of the system. For example, the data storage area 220 may contain data pertaining to road graph data. As will be described in more detail below, the server 215 typically contains one or more programs for implementing a number of pre-processing steps (e.g. downsampling, progressive road type removal, etc.) on the road graph data, which are intended to reduce the size of the road graph while still preserving enough of the road graph to generate accurate travel sheds. Alternatively or in addition, the programs on the server 215 may also pre-process the road graph data (either in a reduced form or from the original size) into one or more formats (e.g. directed graph, point cost matrix, geohash table, etc.) that allow for rapid determinations of travel times. In another implementation, other computers (e.g. additional server computers 215 and/or third party server computers 225) may be utilized in parallel to rapidly process the road graph data in order to rapidly determine travel times.

The travel shed system 200 communicates with one or more third party servers 225 via public or private networks. The third party servers 225 include servers maintained by businesses that periodically send relevant information to the server 215. For example, the servers may send data relevant to road graphs, traffic conditions, public transit schedules, etc. The travel shed system 200 aggregates the data received from the third party servers 225 and stores the received data in data storage areas 220. Data storage areas 220 may also contain data received from mobile devices 205 or personal computers 210. For example, feedback may be provided to the server 215 regarding travel times (e.g. users may indicate if predicted travel times were accurate, mobile devices 205 may sense locations and indicate actual travel times for general feedback or to establish personalized travel speeds, etc.)

The mobile devices 205 and personal computers 210 communicate with each other and the server 215 and third party servers 225 through networks 240, including, for example, the Internet. The mobile devices 205 communicate wirelessly with a base station or access point using a wireless mobile telephone standard, such as the Global System for Mobile Communications (GSM), or another wireless standard, such as IEEE 802.11, and the base station or access point communicates with the server 215 and third party servers 225 via the networks 240. Personal computers 210 communicate through the networks 240 using, for example, TCP/IP protocols.

Figure 3:
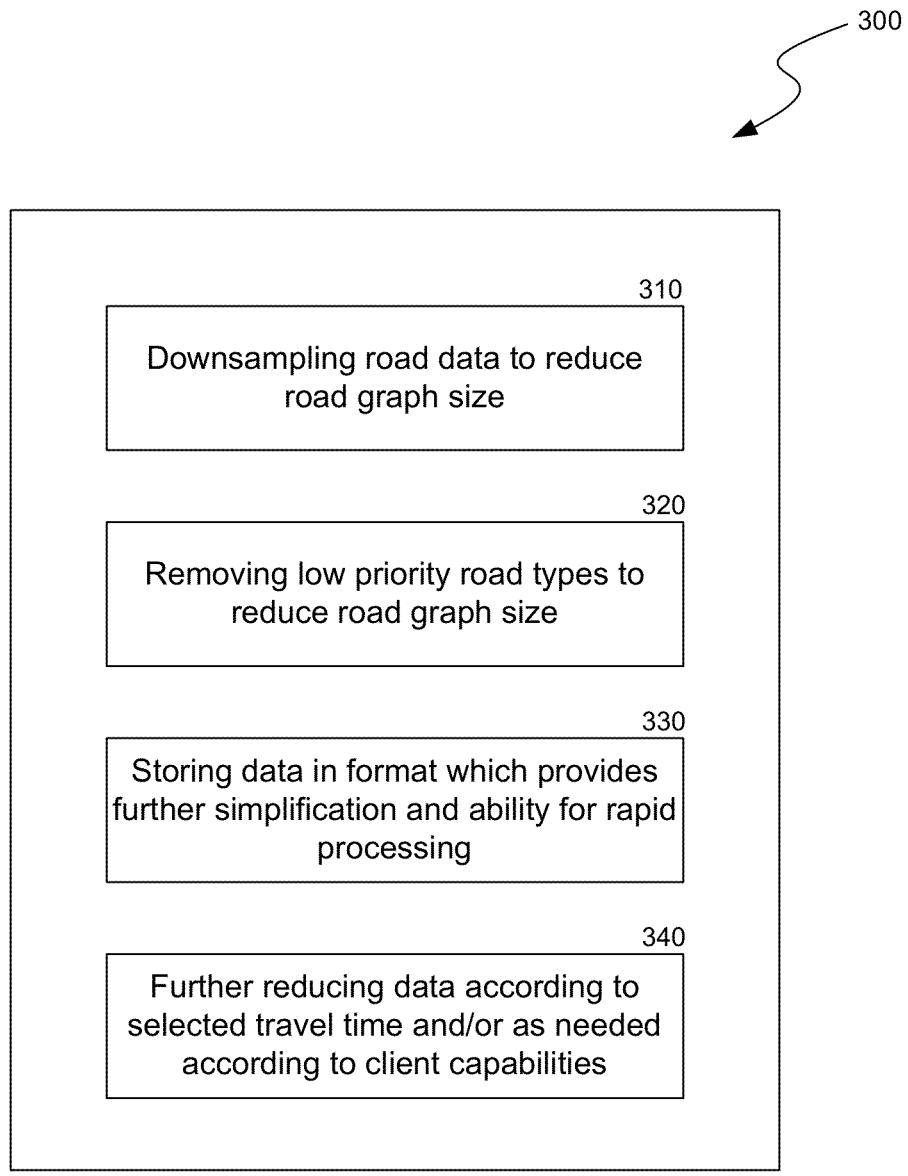
FIG. 3 is a block diagram representing simplifications that may be performed on map data in order to enable fast calculations of travel times and corresponding travel sheds.

FIG. 3 is a block diagram 300 generally representing simplifications that may be performed by the system on map data in order to enable fast calculations of travel times and travel sheds. As shown in FIG. 3, a block 310 represents a process of downsampling road data to reduce a road graph size. A block 320 represents a process of removing low priority road types to reduce a road graph size. A block 330 represents a process of storing road graph data in a format which provides for further simplification and the ability for rapid processing. A block 340 represents a process of further reducing data according to a selected travel time and/or if needed according to a given client's capabilities. Each of the processes represented by the blocks 310-340 will be described in more detail below with respect to FIGS. 4-10.

Figure 4:
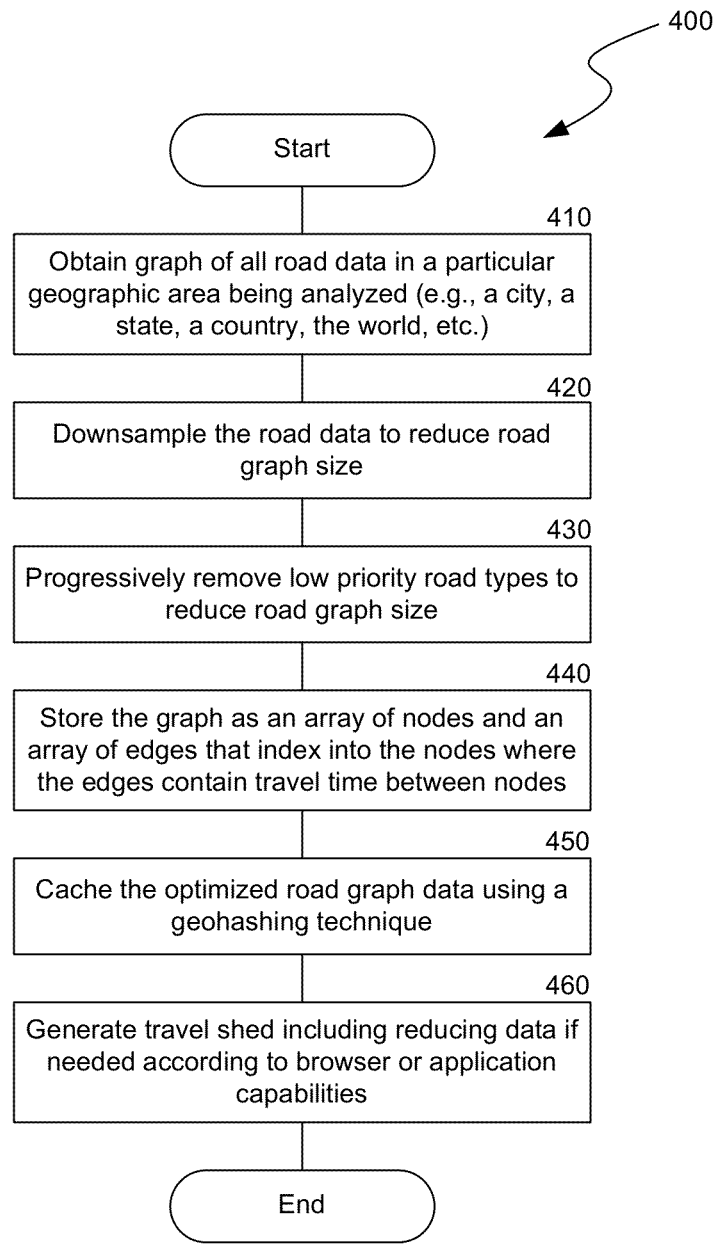
FIG. 4 is a flowchart showing one implementation of a method for simplifying map data and performing fast calculations of travel times and corresponding travel sheds.

FIG. 4 is a flowchart 400 showing an embodiment of a method for simplifying map data and performing fast calculations of travel times. In one embodiment, the disclosed system and method may be used or implemented by, for example, the "walk score" system described in U.S. Publication Number 2009/0088967, entitled "Systems, Techniques, and Methods for Providing Location Assessments," which is commonly assigned and incorporated herein by reference in its entirety. As shown in FIG. 4, at a block 410, the system obtains a graph of all of the road data in a particular geographic area being analyzed (e.g. a city, a state, a country, the world, etc.). As will be described in more detail below, the system implements a number of pre-processing steps intended to reduce the size of the road graph data while still preserving enough of the road graph to generate accurate travel sheds.

At a block 420, the road data is downsampled by the system. At a block 430, the system progressively removes low priority road types in order to further reduce the road graph size, while still maintaining the ability to generate an accurate travel shed. At a block 440, after having reduced the graph size in blocks 420 and 430 by making the graph progressively more sparse, the system further simplifies the graph by storing the graph as an array of nodes and an array of edges that index into the nodes, where the edges contain travel time between nodes.

At a block 450, the system stores optimized graphs for each mode of transport (e.g., drive, walk, bike, transit, etc.) utilizing a geohashing technique. The file system contains a directory structure for each mode of transport, a directory name that is based on latitude, and a file name that is based on longitude. This allows the system to quickly query exactly the travel time data it needs for each mode of transport to optimize the process of generating a travel shed. At a block 460, a travel shed is rapidly generated, including the further reduction of data if needed according to certain browser or application capabilities.

Figure 5:
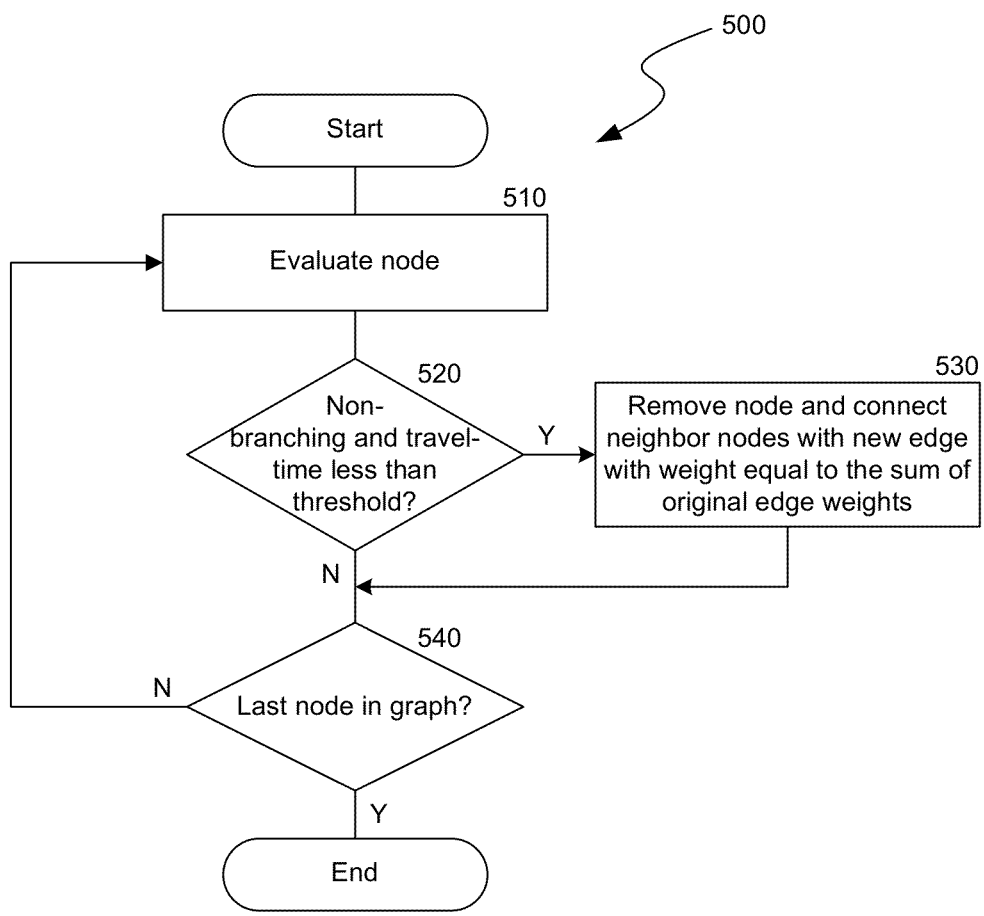
FIG. 5 is a flowchart showing a method for simplifying map data by downsampling in order to reduce a road graph size.

FIG. 5 is a flowchart 500 showing an embodiment of a method for simplifying map data by downsampling in order to reduce a road graph size. As will be described in more detail below, a road graph is composed of nodes (i.e., places where roads intersect) and edges which contain information about the roads (e.g., distance). In order to reduce the size of the graph, the system eliminates nodes that are within a certain threshold distance or travel-time of each other. For example, the system may remove non-branching nodes (i.e., nodes with only two neighbors, which may not be intersections) that are within a specified threshold travel-time (e.g., two minutes) of other nodes.

As shown in FIG. 5, at a block 510, a node is evaluated. At a decision block 520, a determination is made as to whether the node is non-branching and the travel-time is less than a specified travel-time threshold. In one embodiment, the node is determined to be non-branching if there is only one input and one output edge. As an alternative to a travel-time threshold, a threshold distance may instead be utilized. If at the decision block 520 it is determined that the node is not non-branching or that the travel-time is not less than the threshold, then the system continues to a decision block 540, as will be described in more detail below. If the node is non-branching and the travel-time is less than the threshold, then the system continues to a block 530.

At the block 530, the node is removed and the neighbor nodes are connected with a new edge with a weight equal to the sum of the original edge weights. Edge weights indicate information about the roads (e.g., travel time and/or distance). At the decision block 540, a determination is made as to whether the present node is the last node to be evaluated in the graph. If the present node is not the last node, then the system returns to the block 510 to evaluate the next node. If the present node is the last node to be evaluated, then the method ends.

Figure 6:
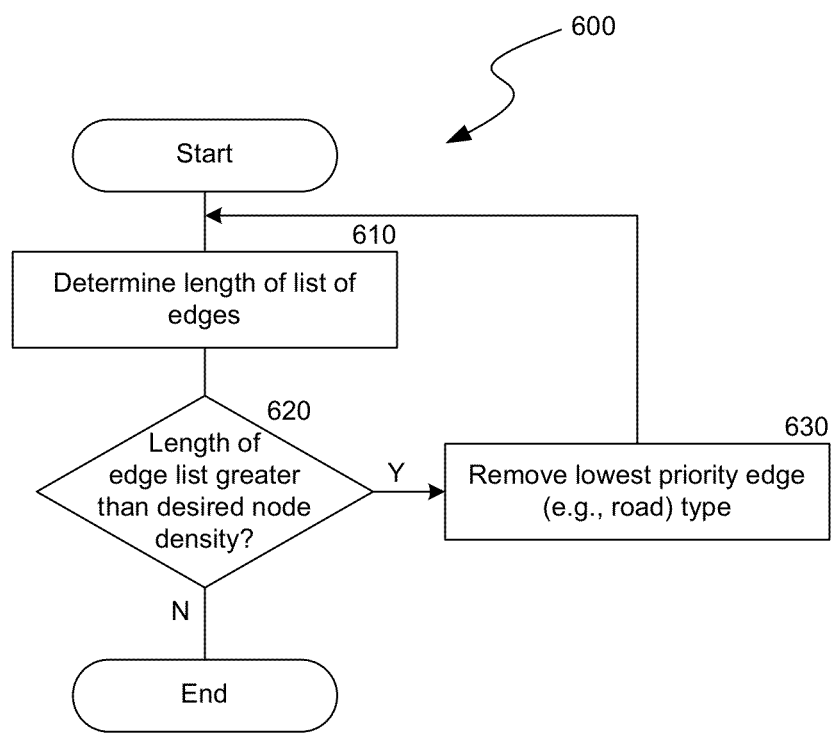
FIG. 6 is a flowchart showing a method for simplifying map data by progressively removing low priority road types so as to reduce a road graph size.

FIG. 6 is a flowchart 600 showing an embodiment of a method for simplifying map data by progressively removing low priority road types so as to reduce a road graph size. As will be described in more detail below, for each mode of transport (e.g., walk, bike, drive, public transit, etc.) the system progressively removes certain types of roads from the graph to reduce the size of the graph while maintaining the ability to generate accurate travel sheds. The system progressively removes road types until the graph has a density of nodes that allows the system to quickly calculate a travel shed. In one embodiment, the density of nodes is calculated per unit area (e.g., 20,000 nodes per square mile). The unit area is determined based on the mode of transport, where the total unit area is designed to encompass the largest travel shed.

As shown in FIG. 6, at a block 610, the length of a list of edges of the road graph is determined. At a decision block 620, a determination is made as to whether the length of the edge list is greater than the desired node density. If the length of the edge list is too long, then the system proceeds to a block 630, where a lowest priority edge (e.g., road) type is removed, after which the routine returns to the block 610. If the length of the list of edges is within the desired node density, then the method ends.

Figures 7A, 7B, 7C:
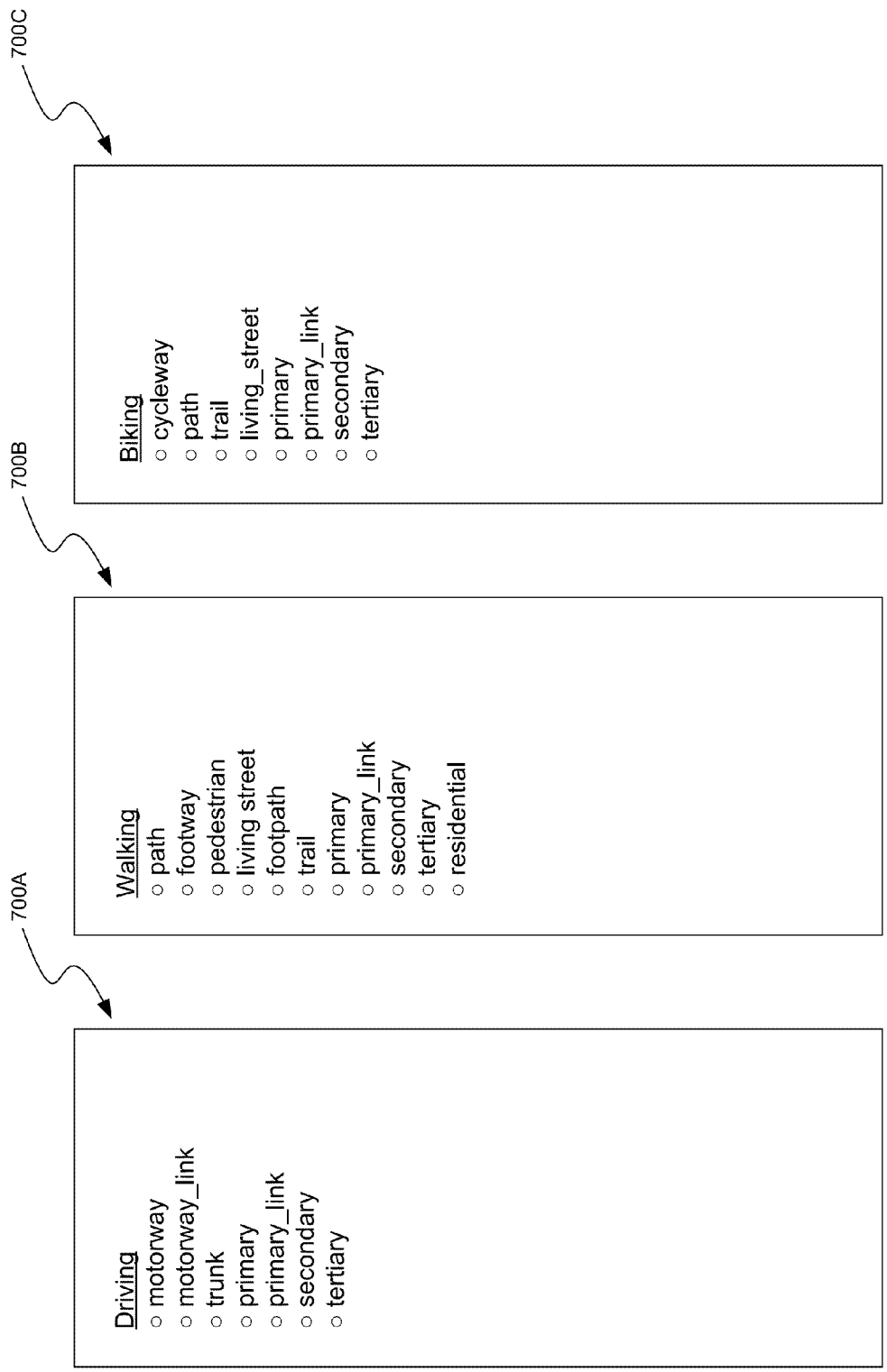
FIGS. 7A-7C are diagrams illustrating road type priorities for different modes of transport including driving, walking and biking.

FIGS. 7A-7C are diagrams illustrating road type priorities for different modes of transport including driving, walking and biking, respectively. It will be appreciated that each mode of transport has a different set of road priorities. FIG. 7A illustrates road type priorities 700A for driving. It will be appreciated that in certain implementations, long drives may cover very large distances and the full road graph may be too large to allow a drive shed to be quickly generated. To reduce the size of the graph, the system progressively eliminates the smallest roads first until the graph reaches the desired density. By preserving large roads and highways, the travel shed may be made to contain the most important roads for driving. As shown in FIG. 7A, in one specific example implementation the road type priority for driving may in progressive order consist of: motorway; motorway link; trunk; primary; primary link; secondary; and tertiary.

FIG. 7B illustrates one example implementation of road type priorities 700B for walking. In one implementation, for walking the system eliminates the largest roads first since these might not accept pedestrians or might be less desirable for walking. By preserving the smallest roads first, the road graph size may be reduced so as to allow the system to quickly generate travel sheds that are accurate for walking. As shown in FIG. 7B, in one specific example implementation the road type priority for walking may in progressive order consist of: path; footway; pedestrian; living street; footpath; trail; primary; primary link; secondary; tertiary; and residential.

FIG. 7C illustrates road type priorities 700C for biking. It will be appreciated that long bike rides may also cover large distances and have large graph sizes. In one implementation, for biking the system removes the largest and smallest roads to keep mid-sized arterial streets. This allows the system to generate accurate bike sheds without having too large of a graph. As shown in FIG. 7C, in one specific example implementation the road type priority for biking may in progressive order consist of: cycle way; path; trail; living street; primary; primary link; secondary; and tertiary.

In certain implementations, certain road graphs and/or road graphs for particular types of transportation may be small enough that the system does need to preprocess the road graph data before generating a travel shed. For example, in certain regions, the road graph size of a public transportation system may be significantly smaller than the road graph size of a general road network, such that the system may not need to preprocess the public transit data before generating a travel shed for a public transit mode of transport. For public transit, the system may utilize one or more public transit API's that access public transit information and return all stop and schedule data for any nearby transit system. This allows the system to quickly query all nearby public transportation for all nearby transit agencies for a given location.

Figure 8:
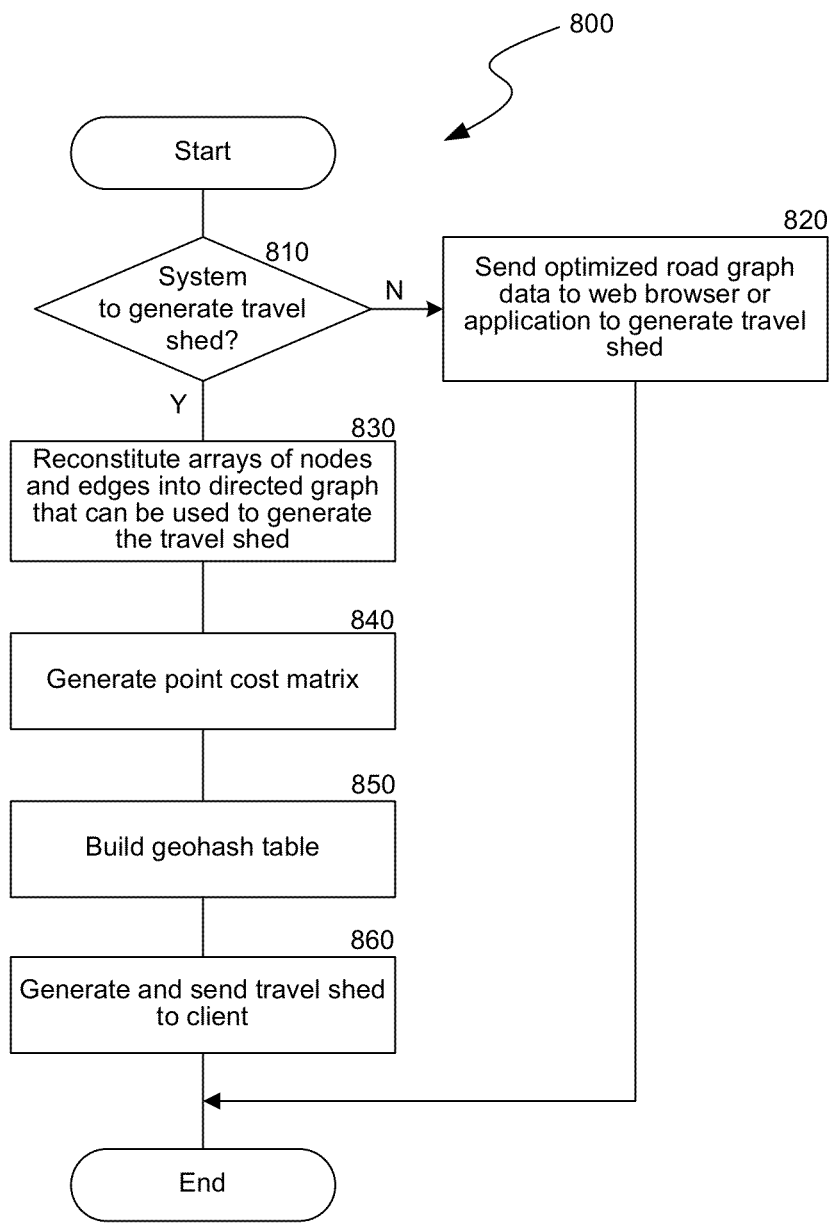
FIG. 8 is a flowchart showing a method for processing optimized road graph data into a directed graph and generating a travel shed.

FIG. 8 is a flowchart 800 showing an embodiment of a method for processing optimized road graph data (e.g. as provided by the processes of FIGS. 5-7) into a directed graph and generating a travel shed. At a decision block 810, a determination is made as to whether the system will transmit the optimized road graph data to a web browser or application to generate a travel shed, or whether the system will calculate the travel shed on a server and transmit the generated travel shed to a client. If the system is to transmit the optimized road graph data rather than generating the travel shed, at a block 820 the optimized road graph data is sent to a web browser or application for generating the travel shed. If the system is to generate the travel shed, then the system continues to a block 830.

At the block 830, the arrays of nodes and edges of the optimized road graph data are reconstituted into a directed graph that can be used to generate the travel shed. In one embodiment, in the case of public transit, this graph may also contain wait times for given transit routes so that the system can accurately simulate how long a user has to wait before starting a public transit trip. This wait time may be set according to selected parameters (e.g. one half the frequency in minutes of the transit route). Such information may be determined from data accessed via a public transit API.

At a block 840, the system generates a point cost matrix (e.g. as will be described in more detail below with respect to FIG. 9.) At a block 850, the system builds a geohash table (e.g. as will be described in more detail below with respect to FIG. 10.) At a block 860, the travel shed is generated and is sent to the client.

Figure 9:
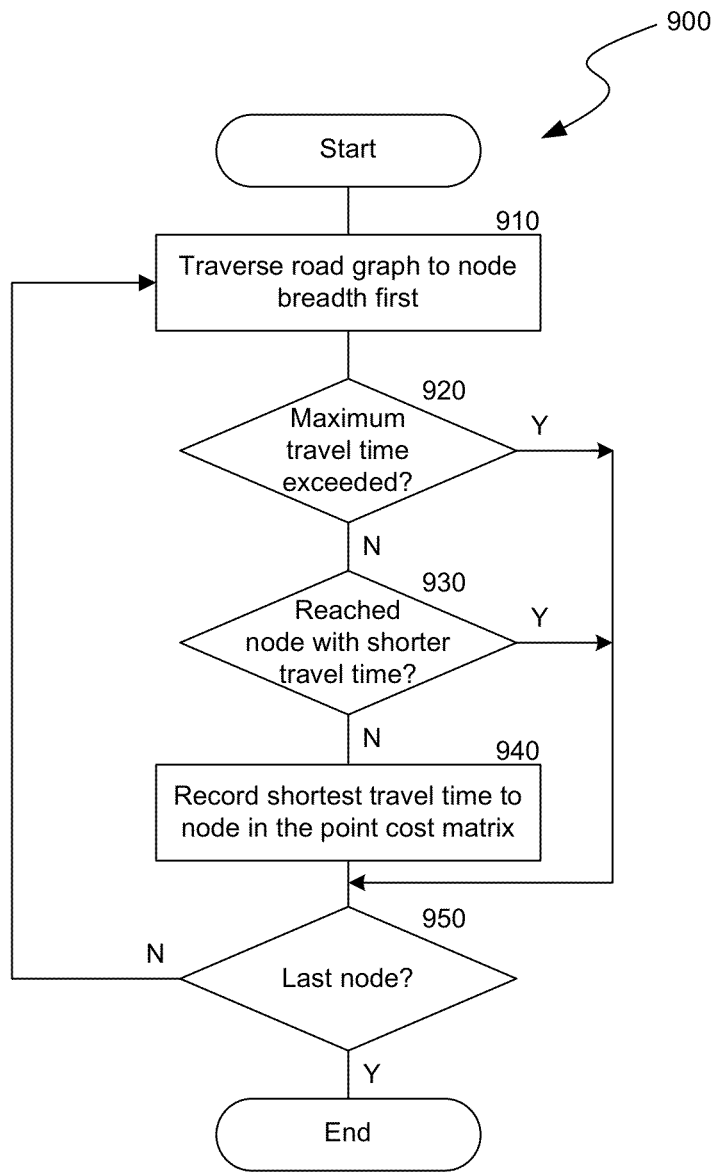
FIG. 9 is a flowchart showing a method for generating a point cost matrix by utilizing a breadth first traversal.

FIG. 9 is a flowchart 900 showing an embodiment of method for generating a point cost matrix by utilizing a breadth first traversal. As will be described in more detail below, a breadth first traversal may be utilized to generate travel times to each node in the graph. In certain implementations, the breadth first traversal may be relatively efficient in that the system is more likely to see the fastest travel times earlier in the traversal. It will be appreciated, however that other traversal techniques may alternately be utilized by the system. In general, the system may create a point cost matrix of the cost in time that it takes to reach each node. The point cost matrix is an array of tuples that contain time it takes to reach a given latitude and longitude. To generate a travel shed for a given time, the system will then discard any tuples that have a travel time greater than the given time. In some circumstances, such as for public transit, the system may utilize off-graph traversal to determine transfers from one transit route to another. Such off-graph traversals may be limited by traversal perimeters, such as using a constant walking speed of a selected value with a maximum transfer distance of a selected value (e.g. using a constant walking speed of 3 mph with a maximum transfer distance of ¼ mile).

As shown in FIG. 9, at a block 910, the system traverses the road graph to a node breadth first. At a decision block 920, a determination is made as to whether a maximum travel time has been exceeded. If the maximum travel time has been exceeded, then the system proceeds to a decision block 950, as will be described in more detail below. If the maximum travel time has not been exceeded, then the system proceeds to a decision block 930.

At the decision block 930, a determination is made as to whether the node has already been reached with a shorter travel time. If the node has been reached with a shorter travel time, then the system proceeds to a decision block 950, as will be described in more detail below. If the node has not been reached with a shorter travel time, then the system proceeds to a block 940, where the system records the shortest travel time to the node in the point cost matrix.

At the decision block 950, a determination is made as to whether the present node is the last node to be evaluated in the road graph. If the present node is the last node, then the method ends. If the present node is not the last node, then the system returns to the block 910, where the traversal is begun to the next node.

For depicting or drawing a travel shed, a number of methods may be utilized. In one specific example embodiment, bubbles may be made to expand around each reachable node at a speed that is consistent with the transport mode. For example, at each reachable node an expanding bubble may be drawn with a radius that is a constant speed for driving, biking, walking, etc. In alternative embodiments, a method for drawing a travel shed may consist of calculating the union of all these bubbles and drawing polygons or other geometric shapes representing the reachable areas. In yet another embodiment, a travel time contour map may be utilized where polygons or other geometric shapes are drawn connecting nodes in the graph that are reachable at specific time intervals. For many applications, such as searching for apartments or homes within a given travel time, the system may utilize a method for rapidly testing for inclusion in a travel shed. As will be described more detail below with respect to FIG. 10, in order to achieve this goal, the system may build a geohash table that allows the system to rapidly find the nearest nodes and associated travel times for any point in the road graph.

Figure 10:
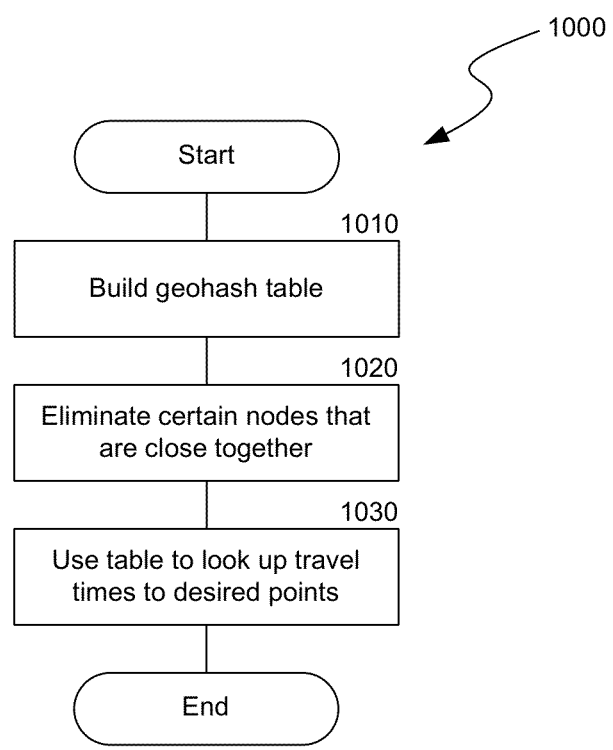
FIG. 10 is a flowchart showing a method for building and utilizing a geohash table to rapidly find the nearest nodes and associated travel times for any point on a map.

FIG. 10 is a flowchart 1000 showing an embodiment of a method for building and utilizing a geohash table to rapidly find the nearest nodes and associated travel times for any point on a map. At a block 1010, the system begins the building of the geohash table. At a block 1020, in order to optimize the performance of the lookups, the system eliminates nodes that are close together so as to reduce the number of required lookups. At a block 1030, once the geohash table is built by the system, the system is able to rapidly look up the travel time to any point. As a specific example where a search is being made for apartments, the system may be enabled to show the travel time to any nearby apartment or allow users to sort apartments by travel time.

As will be described in more detail below, a number of additional factors may affect travel times that are not related to the underlying road network. As specific examples, heavy traffic may affect drive times, and hills may affect the speed at which people can bike or walk, etc. Travel sheds may therefore be made to be more accurate by incorporating such factors (e.g., traffic, elevation data, etc.) into the road graph. In one example implementation, traffic data may be utilized to adjust the road speed from the posted speed limit to the actual average driving speed during different times of the day. When the system converts a graph edge from distance into a travel time, the system may do so utilizing the posted speed limit of the road, or may utilize the actual travel speed based on traffic data. This technique can be utilized to generate travel sheds for driving that cover different distances at different times of day. As a specific example, a rush hour travel shed for driving may be smaller than a travel shed calculated when there is less traffic.

Similarly, in another example embodiment, hills may be utilized to adjust travel sheds for walking and biking. When the distance of a graph edge is converted into a travel time, hills can be used to apply a penalty to the travel speed. For example if an average biker rides at a specified average travel speed, an elevation gain can be utilized by the system to penalize this speed for each percent of grade increase. Each percentage of elevation grade decrease can similarly be used in reverse to increase the biking speed up to some maximum speed. A similar technique can be applied when generating travel sheds for walking.

Figure 11:
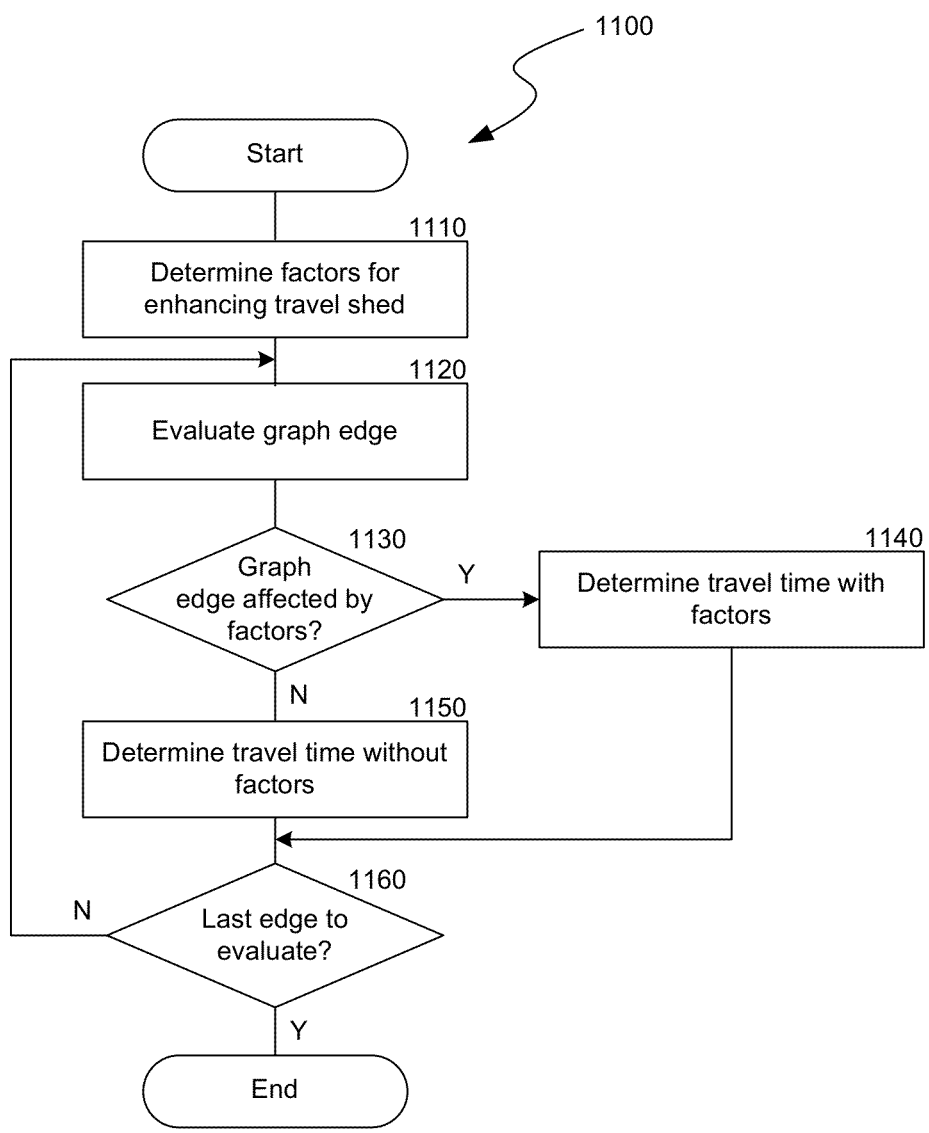
FIG. 11 is a flowchart showing a method for enhancing the determination of travel times utilizing additional factors that may affect particular modes of transport.

FIG. 11 is a flowchart 1100 showing an embodiment of a method for enhancing the determination of travel times utilizing additional factors that may affect particular modes of transport. At a block 1110, factors are determined that may be utilized for enhancing the travel shed (e.g., traffic, elevation, etc.). At a block 1120, a graph edge is evaluated. At a decision block 1130, a determination is made as to whether the graph edge is affected by the enhancing factors. If the graph edge is affected by the enhancing factors, then the system proceeds to a block 1140, where the distance indicated by the graph edge is converted to a travel time utilizing the enhancing factors. If the graph edge is not affected by the enhancing factors, then the system proceeds to a block 1150, where the distance indicated by the graph edge is converted to a travel time without using the enhancing factors. At a decision block 1160, a determination is made as to whether the present graph edge is the last edge to be evaluated. If the present edge is the last edge to be evaluated, then the method ends. If the present edge is not the last edge to be evaluated, then the system returns to the block 1120 where the next graph edge is evaluated.

It will be appreciated that one use of a travel shed (e.g. such as that described above with respect to FIG. 1) is to utilize the area of the travel shed as a method for searching for points of interest (e.g. homes, apartments, hotels, restaurants, schools, parks, etc.). In one embodiment, the system may generate a user interface with a slider that allows a user to specify that they want to find selected points of interest (e.g. homes, apartments, hotels, restaurants, schools, parks, etc.) within a specified travel time from a desired destination (e.g. a workplace) utilizing a specified mode of transport (e.g. public transit, driving, biking, walking, etc.).

Figure 12:
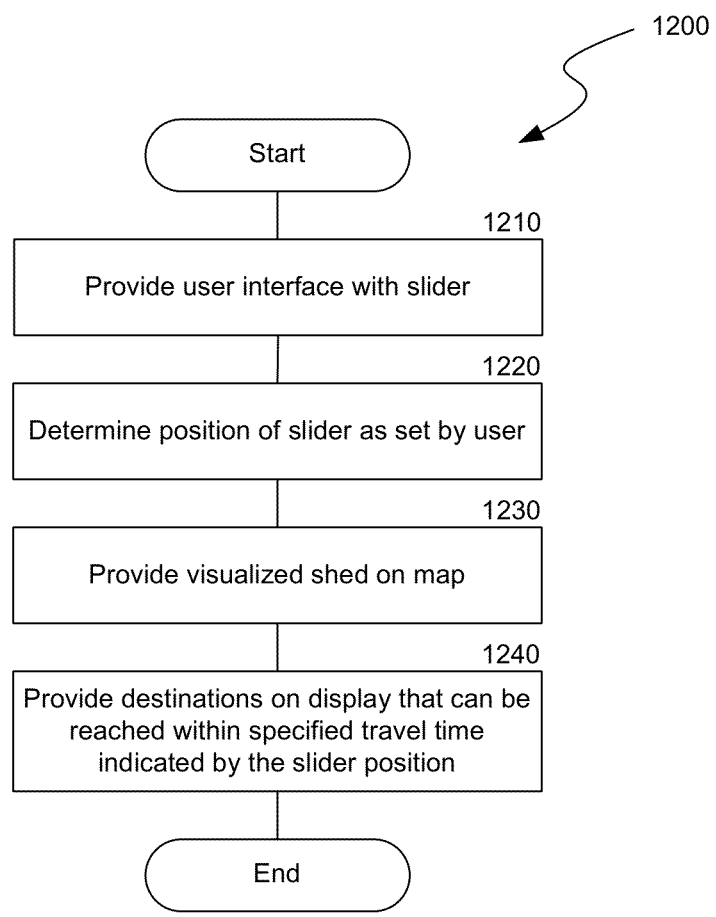
FIG. 12 is a flowchart showing a method for generating and utilizing a travel shed to determine desirable points of interest that can be reached within a selected travel time.

As shown in FIG. 12, at a block 1210, a user interface with a slider is provided. At a block 1220, a determination is made as to the position of the slider as set by a user. At a block 1230, a visualized travel shed is provided on a map. At a block 1240, destinations are provided on the display that can be reached within the specified travel time indicated by the slider position. One embodiment of such a display is described above with respect to FIG. 1.

Figure 13:
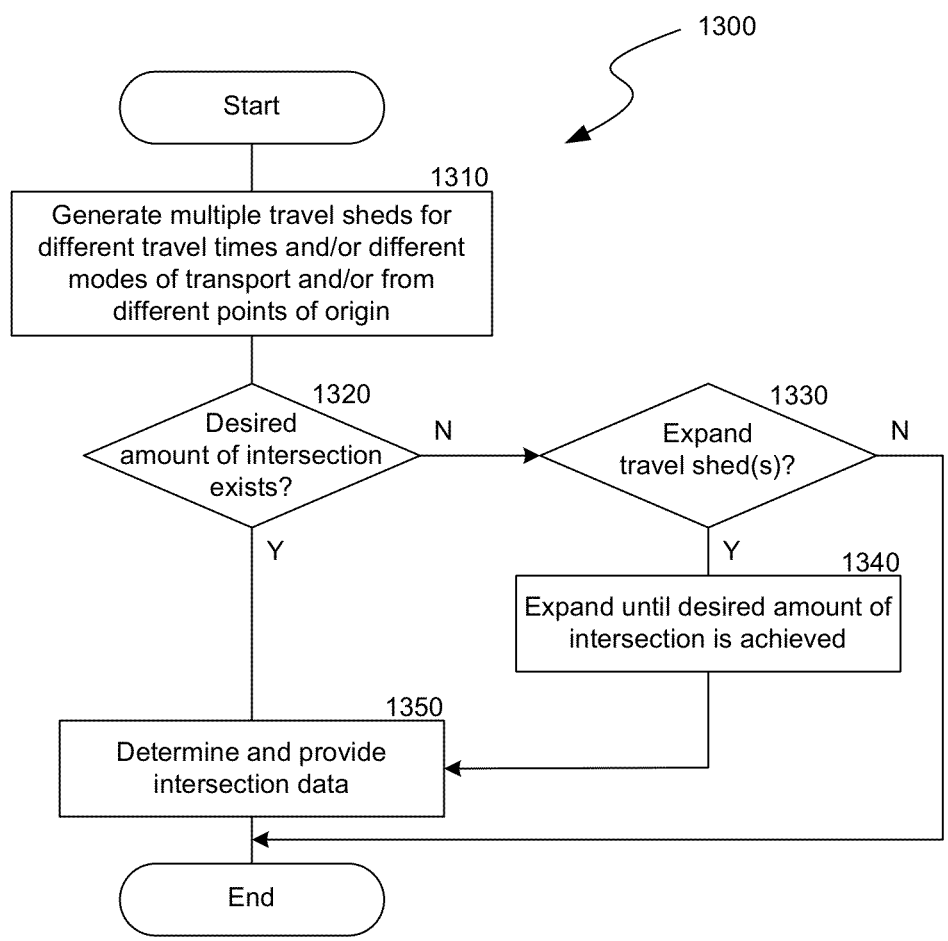
FIG. 13 is a flowchart showing a method for generating multiple travel sheds for different travel times and/or different modes of transport and/or from different points of origin.

FIG. 13 is a flowchart 1300 showing an embodiment of a method for generating multiple travel sheds for different travel times and/or different modes of transport and/or from different points of origin. As will be described in more detail below, the ability to generate multiple travel sheds may have numerous applications. As a specific example, a family may have multiple commutes to multiple schools, jobs, friends' locations, etc. If different family members work in different locations, a travel shed can be generated by the system for each travel and the intersection of both travel sheds can be calculated by the system in a search for places to live. In one embodiment, if an intersection between the travel sheds does not yet exist, the travel sheds may be expanded until a desired intersecting area is determined.

As shown in FIG. 13, at a block 1310, multiple travel sheds are generated for different travel times and/or different modes transport and/or from different points of origin. At a decision block 1320, a determination is made as to whether a desired amount of intersection exists between the travel sheds. If a desired amount of intersection exists, then the system proceeds to a block 1350, as will be described in more detail below. If a desired amount of intersection does not yet exist, then the system proceeds to a decision block 1330.

At the decision block 1330, a determination is made as to whether one or more of the travel sheds should be expanded. If the travel sheds are not to be expanded, then the method ends. If the travel sheds are to be expanded, then the system proceeds to a block 1340, where the travel sheds are expanded until a desired amount of intersection is achieved. At the block 1350, the intersection data is determined and provided.

Figure 14:
FIG. 14 is a diagram of a screen display illustrating an example visual representation of map data and the intersection of two travel sheds representing two different modes of transport from two different points of origin.

FIG. 14 is a diagram of a screen display 1400 illustrating an example visual representation of map data and two travel sheds representing two different modes of transport from two different points of origin. As shown in FIG. 14, a selection area 1405 is provided with a series of tabs that the user may select (e.g. "apartments and rentals", etc.). For a first travel shed, a point of origin field 1410 is provided for a user to specify a point of origin (e.g. Seattle, Wash.). A slider bar 1412 is provided for a user to specify a travel time (e.g. 15 minutes). A mode of transport bar 1414 is provided for a user to select from different modes of transport using buttons A, B, C and D (e.g. for the first travel shed, button B has been selected for driving.) A "go" button 1416 is provided for a user to initiate a process for generating the first travel shed.

Similarly, for a second travel shed, a point of origin field 1420 is provided for a user to specify a point of origin (e.g. University of Washington, Seattle.) A slider bar 1422 is provided for a user to specify a travel time (e.g. 25 minutes). A mode of transport bar 1424 is provided for a user to select from different modes of transport using buttons A, B, C and D (e.g. for the second travel shed, button C has been selected for biking.) A "go" button 1426 is provided for a user to initiate a process for generating the second travel shed.

As shown in FIG. 14, after the first and second travel sheds have been generated, the apartments or rentals located within the intersecting area of the travel sheds are listed in a results area 1430. A first example result 1432 shows a one bedroom apartment in Capital Hill with a 23 minute combined travel time, and a second example result 1434 shows an apartment building in Westlake with a 31 minute combined travel time. For the first example result 1432, the combined travel time of 23 minutes consists of a 4 minute drive from the first travel shed, and a 19 minute bike ride from the second travel shed. For the second example result 1434, the 31 minute combined travel time consists of a 7 minute drive from the first travel shed, and a 24 minute bike ride from the second travel shed.

A map area 1450 includes a visualization of the combined travel sheds. For the first travel shed, a point of origin 1460 (i.e. corresponding to the entry "Seattle" in the point of origin field 1410) is indicated on the map. A travel shed area 1465 (e.g. indicated by a solid line border) for the first travel shed indicates the area that can be reached within the travel time indicated by the slider bar 1412 (e.g. 15 minutes) utilizing the mode of transport selected in the bar 1414 (e.g. driving.)

Similarly, for the second travel shed, a point of origin 1470 (i.e. corresponding to the entry "UW Seattle" in the point of origin field 1420) is indicated on the map. A travel shed area 1475 (i.e. indicated by a dotted line border) indicates the area that can be reached within the travel time indicated by the slider bar 1422 (e.g. 25 minutes) utilizing the mode of transport selected in the bar 1424 (e.g. biking.) An area of 1480 indicates the overlapping area between the first and second travel sheds, which yields the locations that satisfy the commuting preferences for both the first and second travel sheds. Visual indications are provided of the available apartments and rentals in the overlapping area 1480, which are also listed in the results area 1430.

In other embodiments, the combined travel shed process of FIG. 14 may also be performed for additional travel sheds (e.g. corresponding to additional people or addresses, such as an additional travel shed to a school, etc.). In addition, an individual person may wish to generate multiple travel sheds for different modes of transport to a single location. For example a person may want to have an option for a travel shed for a 20 minute bike ride to work intersected with a travel shed for a 30 minute public transit option to work. The overlapping area of these travel sheds could be utilized to determine the locations that allow either of the desired commuting options to be used for reaching the same office location.

From the foregoing, it will be appreciated that specific embodiments of the invention have been described herein for purposes of illustration, but that various modifications may be made without deviating from the scope of the invention. For example, those skilled in the art will appreciate that the depicted flow charts may be altered in a variety of ways. More specifically, the order of the steps may be re-arranged, steps may be performed in parallel, steps may be omitted, other steps may be included, etc. Accordingly, the invention is not limited except as by the appended claims.

We claim:

1. A computer implemented method of providing a transit shed utilizing processed road graph data, comprising:
  receiving an indication of a location and an indication of a desired travel time,
    wherein both indications are received via a graphical interface; and
  displaying a transit shed on the graphical interface,
    wherein the transit shed depicts a geographic area having determined travels time to or from the indicated location via a first mode of transport, the determined travel time not exceeding the desired travel time, and
    wherein determining the determined travel times includes:
      obtaining, with a computer, road graph data regarding the geographic area to be evaluated;
      processing, with the computer, the road graph data utilizing a set of criteria related to the first mode of transport, the set of criteria being utilized to determine a lower priority portion of the road graph data that is considered to have a lower priority for use when calculating travel times for the first mode of transport as compared to a higher priority portion of the road graph data that is considered to have a higher priority for use when calculating travel times for the first mode of transport; and
      storing, with the computer, the processed road graph data as a set of reduced road graph data to be utilized for calculating travel times for the first mode of transport, the set of reduced road graph data not including the lower priority portion of the road graph data.

2. The computer-implemented method of claim 1, wherein the set of criteria is utilized during the processing to continue to increase the lower priority portion of the road graph data until the remaining higher priority portion of the road graph data is smaller than a specified threshold.

3. The computer-implemented method of claim 1, wherein the set of criteria relates to a set of road type priorities for the first mode of transport.

4. The computer-implemented method of claim 1, wherein additional enhancing data is stored in conjunction with the road graph data for enhancing the calculations of travel times, including at least one of elevation data, rush-hour data, priority lanes, user generated feedback, and personalized speeds.

5. The computer-implemented method of claim 4, wherein the road map data comprises nodes and edges, and at least some nodes with distances to neighboring nodes that are below a specified threshold are not saved with the reduced road map data.

6. The computer-implemented method of claim 1, wherein the set of reduced road graph data is stored as an array of nodes and an array of edges that index into the nodes, the edges containing at least one of distance or travel time between nodes.

7. The computer-implemented method of claim 1, further comprising:
  processing, with the computer, the road graph data utilizing a set of criteria related to a second mode of transport, the set of criteria being utilized to determine a lower priority portion of the road graph data that is considered to have a lower priority for use when calculating travel times for the second mode of transport as compared to a higher priority portion of the road graph data that is considered to have a higher priority for use when calculating travel times for the second mode of transport: and
  storing, with the computer, the processed road graph data as a set of reduced road graph data to be utilized for calculating travel times for the second mode of transport, the set of reduced road graph data not including the lower priority portion of the road graph data, the set of reduced road graph data for the second mode of transport being different than the set of reduced road graph data for the first mode of transport.

8. The computer-implemented method of claim 7, wherein the first and second modes of transport each comprise a different one of driving, biking, walking or public transportation.

9. The computer-implemented method of claim 8, wherein in the related sets of criteria, large roads are given the highest priority for driving, small roads are given the highest priority for walking, and mid-sized roads are given the highest priority for biking.

10. A computing system comprising:
  a memory for storing a sequence of program instructions; and
  a processor that is configured to execute the sequence of instructions to provide a transit shed utilizing processed road graph data, by:
    receiving an indication of a location and an indication of a desired travel time, wherein both indication are received via a graphical interface;
    processing, with the computer, road graph data utilizing a set of criteria related to a first mode of transport, the set of criteria being utilized to determine a lower priority portion of the road graph data that is considered to have a lower priority for use when calculating travel times for the first mode of transport as compared to a higher priority portion of the road graph data that is considered to have a higher priority for use when calculating travel times for the first mode of transport;

storing, with the computer, the processed road graph data as a set of reduced road graph data to be utilized for calculating determined travel times for the first mode of transport, the set of reduced road graph data not including the lower priority portion of the road graph data; and displaying the transit shed on the graphical interface, wherein the transit shed depicts a geographic area having determined travel times to or from the indicated location via the first mode of transport, the determined travel times being calculated based on the set of reduced road graph data, the determined travel times not exceeding the desired travel time.

11. The computing system of claim 10, wherein the set of criteria is utilized during the processing to continue to increase the lower priority portion of the road graph data until the remaining higher priority portion of the road graph data is smaller than a specified threshold.

12. The computing system of claim 10, wherein additional enhancing data is stored in conjunction with the road graph data for enhancing the calculations of travel times, including at least one of elevation data, rush-hour data, priority lanes, user generated feedback, and personalized speeds.

13. The computing system of claim 10, further comprising:
processing, with the computer, the road graph data utilizing a set of criteria related to a second mode of transport, the set of criteria being utilized to determine a lower priority portion of the road graph data that is considered to have a lower priority for use when calculating travel times for the second mode of transport as compared to a higher priority portion of the road graph data that is considered to have a higher priority for use when calculating travel times for the second mode of transport; and storing, with the computer, the processed road graph data as a set of reduced road graph data to be utilized for calculating travel times for the second mode of transport, the set of reduced road graph data not including the lower priority portion of the road graph data, the set of reduced road graph data for the second mode of transport being different than the set of reduced road graph data for the first mode of transport.

14. The computing system of claim 13, wherein the first and second modes of transport each comprise a different one of driving, biking, walking or public transportation.

15. A non-transitory, computer readable media with instructions stored thereon that when executed, cause a processor to provide a transit shed utilizing processed road graph data, by:
receiving an indication of a location and an indication of a desired travel time, wherein both indications are received via a graphical interface;

processing, with the computer, road graph data utilizing a set of criteria related to a first mode of transport, the set of criteria being utilized to determine a lower priority portion of the road graph data that is considered to have a lower priority for use when calculating travel times for the first mode of transport as compared to a higher priority portion of the road graph data that is considered to have a higher priority for use when calculating travel times for the first mode of transport;

storing, with the computer, the processed road graph data as a set of reduced road graph data to be utilized for calculating travel times for the first mode of transport, the set of reduced road graph data not including the lower priority portion of the road graph data; and displaying the transit shed on the graphical interface, wherein the transit shed depicts a geographic area having determined travel times to or from the indicated location via the first mode of transport, the determined travel times being calculated based on the set of reduced road graph data, the determined travel times not exceeding the desired travel time.

16. The non-transitory computer readable media of claim 15, wherein the set of criteria is utilized during the processing to continue to increase the lower priority portion of the road graph data until the remaining higher priority portion of the road graph data is smaller than a specified threshold.

17. The non-transitory computer readable media of claim 15, wherein additional enhancing data is added to the road graph data for enhancing the calculations of travel times, including at least one of elevation data, rush-hour data, priority lanes, user generated feedback, and personalized speeds.

18. The non-transitory computer readable media of claim 15, further comprising:
processing, with the computer, the road graph data utilizing a set of criteria related to a second mode of transport, the set of criteria being utilized to determine a lower priority portion of the road graph data that is considered to have a lower priority for use when calculating travel times for the second mode of transport as compared to a higher priority portion of the road graph data that is considered to have a higher priority for use when calculating travel times for the second mode of transport; and storing, with the computer, the processed road graph data as a set of reduced road graph data to be utilized for calculating travel times for the second mode of transport, the set of reduced road graph data not including the lower priority portion of the road graph data, the set of reduced road graph data for the second mode of transport being different than the set of reduced road graph data for the first mode of transport.

19. The non-transitory computer readable media of claim 18, wherein the first and second mode of transport each comprise a different one of driving, biking, walking or public transportation.

20. A computer implemented method of providing travel sheds utilizing processed road graph data, comprising:
receiving as inputs a selected mode of transport and a desired travel time,
wherein the inputs are received via a graphical interface;
generating a travel shed for the selected mode of transport, wherein:
the generation of the travel shed utilizes processed road graph data;
the processed road graph data has been processed to determine a lower priority portion of road graph data that is considered to have a lower priority for use when calculating determined travel times for the selected mode of transport as compared to a higher priority portion of road graph data that is considered to have a higher priority for use when calculating determined travel times for the selected mode of transport;
the processed road graph data has been stored as a set of reduced road graph data not including the lower priority portion of the road graph data;
the processed road graph data has been processed to enable determinations of determined travel times between points in the road graph that are represented in the road graph data;
the determined travel times are determined based on the selected mode of transport and associated rates of travel;

the determined travel times between points are further determined based on selected pathways through the road graph between the points; and the selected pathways are determined based on criteria related to the selected mode of transport; and displaying the travel shed on the graphical interface, wherein the transit shed depicts a geographic area having determined travel times between points in the road graph data via the first mode of transport, the determined travel times not exceeding the desired travel time.

21. The computer implemented method of claim 20, wherein the selected mode of transport is one of a plurality of different modes of transport that are presented on a user interface for selection, the plurality of modes of transport comprising at least two of driving, biking, walking or public transportation.

22. The computer implemented method of claim 21, further comprising providing a user interface with an option for generating a plurality of travel sheds to be displayed on the user interface at the same time, each of the travel sheds having the option for being generated for different modes of transport.

23. The computer implemented method of claim 20, wherein the processing of the road graph data reduces the size of the road graph.

24. The computer implemented method of claim 20, wherein the processing of the road graph data includes producing one or more of a directed graph, a point cost matrix, and a geohash table.

25. The computer implemented method of claim 20, wherein the processing of the road graph data is accomplished utilizing a plurality of computers in parallel.

\* \* \* \* \*

UNITED STATES PATENT AND TRADEMARK OFFICE
CERTIFICATE OF CORRECTION

PATENT NO. : 9,195,953 B2  
APPLICATION NO. : 13/587680  
DATED : November 24, 2015  
INVENTOR(S) : Borgerson et al.

Page 1 of 1

It is certified that error appears in the above-identified patent and that said Letters Patent is hereby corrected as shown below:

In the claims,

In column 16, line 56, in claim 10, delete "indication" and insert -- indications --, therefor.

Signed and Sealed this  
Twenty-second Day of March, 2016

Michelle K. Lee  
*Director of the United States Patent and Trademark Office*